(12) United States Patent
Fraundorfer (10) Patent No.: US 11,472,541 B2
(45) Date of Patent: Oct. 18, 2022

(54) AUTOGYRO HAVING AN INSTRUMENT PANEL

(71) Applicant: Fraundorfer Aeronautics AG, Genderkingen (DE)

(72) Inventor: Christoph Fraundorfer, Nassenfels (DE)

(73) Assignee: Fraundorfer Aeronautics AG, Genderkingen (DE)

(*) Notice: Subject to any disclaimer, the term of this patent is extended or adjusted under 35 U.S.C. 154(b) by 300 days.

(21) Appl. No.: 16/646,585

(22) PCT Filed: Sep. 12, 2018

(86) PCT No.: PCT/EP2018/074599
§ 371 (c)(1),
(2) Date: Mar. 12, 2020

(87) PCT Pub. No.: WO2019/053058
PCT Pub. Date: Mar. 21, 2019

(65) Prior Publication Data
US 2020/0283133 A1 Sep. 10, 2020

(30) Foreign Application Priority Data

Sep. 12, 2017 (DE) .................... 10 2017 121 072.5
Jan. 23, 2018 (DE) .................... 10 2018 101 412.0

(51) Int. Cl.
*B64C 27/02* (2006.01)
*B64D 43/00* (2006.01)
*B64C 27/82* (2006.01)

(52) U.S. Cl.
CPC .............. *B64C 27/02* (2013.01); *B64D 43/00* (2013.01); *B64C 2027/8236* (2013.01); *B64C 2201/024* (2013.01); *B64C 2201/108* (2013.01)

(58) Field of Classification Search
CPC ........ B64C 27/02; B64C 27/028; B64D 43/00
See application file for complete search history.

(56) References Cited

U.S. PATENT DOCUMENTS

| 2002/0104919 | A1  | 8/2002 | Geranio et al. |
| 2011/0084106 | A1  | 4/2011 | Bopp et al. |
| 2011/0199661 | A1* | 8/2011 | Kreitmair-Steck .......................... G02B 27/0103 359/13 |

(Continued)

FOREIGN PATENT DOCUMENTS

| CN | 105 314 099 A | 2/2016 |
| CN | 105314099 A * | 2/2016 |

(Continued)

OTHER PUBLICATIONS http://www.heli-archive.ch/en/helicopters/in-depth-articles/mil-mi-6/ Mari Bazani, Dec. 2014.

*Primary Examiner* — Richard G Davis
(74) *Attorney, Agent, or Firm* — Dority & Manning, P.A.

(57) ABSTRACT

An autogyro includes an autorotation rotor and an instrument panel that includes comprising one or both of a display unit and a control unit. The instrument panel has a viewing window formed by a recess in the instrument panel located to expand a field of view for an autogyro pilot. A pilot seat is arranged in front of the instrument panel and is positioned centrally in a transverse direction of the autogyro in front of the instrument panel.

13 Claims, 9 Drawing Sheets

(56) References Cited

U.S. PATENT DOCUMENTS

| | | |
|---|---|---|
| 2013/0265425 A1 | 10/2013 | Smailus et al. |
| 2014/0027565 A1 | 1/2014 | Marvin et al. |
| 2014/0159926 A1 | 6/2014 | Van Staagen |
| 2014/0175220 A1* | 6/2014 | Durand ................ B64C 1/1476 244/118.5 |
| 2014/0291444 A1* | 10/2014 | Bau ....................... B64D 13/06 244/118.5 |

FOREIGN PATENT DOCUMENTS

| | | |
|---|---|---|
| CN | 106 143 884 A | 11/2016 |
| DE | 10 2015 213 592 A1 | 1/2017 |
| EP | 2 783 987 A2 | 10/2014 |
| EP | 3 243 751 A1 | 11/2017 |
| FR | 2 991 295 A1 | 12/2013 |

* cited by examiner

AUTOGYRO HAVING AN INSTRUMENT PANEL

FIELD OF THE INVENTION

The present invention relates to an autogyro comprising a rotor capable of being set into autorotation, and an instrument panel, which includes at least one display unit and/or at least one control unit, wherein the instrument panel comprises at least one viewing window for expanding the field of view for an autogyro pilot and which is formed by a recess formed in the instrument panel, and comprising a pilot seat arranged in front of the instrument panel.

BACKGROUND

Since the invention of autogyros, instrument panels have been utilized for displaying flight parameters to the pilot and providing control capabilities of the aircraft.

SUMMARY

A problem addressed by the present invention is therefore that of providing an autogyro, which has been improved with respect to the related art. Additional objects and advantages of the invention will be set forth in part in the following description, or may be obvious from the description, or may be learned through practice of the invention.

The problems are solved by an autogyro having the features described and claimed herein.

The invention relates to an autogyro comprising a rotor capable of being set into autorotation, which can generate lift for the autogyro. Moreover, the autogyro comprises an instrument panel, which includes at least one display unit and/or at least one control unit.

The instrument panel for the autogyro includes at least one display unit. The instrument panel can therefore be an autogyro instrument panel. The instrument panel is arranged in a front region of a cockpit of the autogyro. An autogyro pilot sits in front of the instrument panel in the cockpit, so that the pilot always has a view of the instrument panel and the display unit. With the aid of the display unit, parameters of the autogyro and the flight can be communicated to the autogyro pilot. By means of the display unit, for example, a flight altitude, an airspeed, a rate of ascent and/or a rate of descent can be displayed. The display unit can include, for example, a digital display and/or an analog display. Moreover, multiple flight parameters can be displayed, for example, with the aid of a single display unit, for example, as a display.

Additionally or alternatively, the instrument panel can also include at least one control unit. With the aid of the control unit, for example, a frequency of a radio can be set.

The instrument panel comprises at least one viewing window for expanding the field of view for the autogyro pilot; the viewing window formed by a recess formed in the instrument panel. The recess is the viewing window, through which the pilot can observe the surroundings of the autogyro. As a result, air safety is increased, since the hidden regions of the surroundings are reduced for the pilot.

In addition, the autogyro comprises a pilot seat arranged in front of the instrument panel.

Moreover, the pilot seat is positioned centrally, in the transverse direction of the autogyro, in front of the instrument panel. As a result, the pilot has a central view of the instrument panel and can comfortably reach all points of the instrument panel.

It is advantageous when the recess is arranged in a middle region in the transverse direction of the instrument panel, so that a view forward out of the autogyro is possible for the pilot. The recess can also be arranged in the center of the instrument panel.

It is advantageous when the recess extends completely through the instrument panel. As a result, the size of the viewing window can be increased, in order to provide the pilot with a larger field of view.

Additionally or alternatively, the recess can extend from a front side of the instrument panel comprising the display unit and/or control unit to a diametrically opposed back side of the instrument panel. As a result, it is possible to gaze at a region behind the back side of the instrument panel.

Moreover, it is advantageous when the recess extends, starting from a top side of the instrument panel, in the direction of a bottom side of the instrument panel. The top side and the bottom side relate to the typical orientation of the instrument panel in the autogyro. The pilot gazes forward, for example, over the top side of the instrument panel. The recess therefore extends from top to bottom. As a result, the pilot can gaze through the recess and observe the regions ahead of the autogyro.

Additionally or alternatively, the recess comprises an upper opening in the region of the top side of the instrument panel. As a result, the gaze of the pilot is not obstructed.

Additionally or alternatively, at least one recess can extend from a bottom side of the instrument panel in the direction of a top side of the instrument panel. As a result, it is possible to gaze steeply downward ahead of the autogyro. As a result, for example, a front wheel of the autogyro can be observed.

It is advantageous when the recess extends, starting from the top side, only partially in the direction of the bottom side, so that the instrument panel comprises a connecting part, which extends in the transverse direction of the instrument panel and connects a left part and a right part—as viewed from the front—of the instrument panel to one another. As a result, the instrument panel can be designed as one piece. In the connecting part, it is also possible to arrange, for example, cables for transmitting electrical energy and/or cables for the communication between display and/or control units of the left part and the right part.

It is also advantageous when the instrument panel has a U-shape in a front view. The left part, the connecting part, and the right part are therefore arranged in such a way that the instrument panel has the U-shape.

It is advantageous when the recess, starting from the top side, extends completely to the bottom side, so that the recess comprises a lower opening in the region of the bottom side. As a result, the gaze of the pilot is not obstructed at the bottom side of the instrument panel.

Additionally or alternatively, the left part and the right part of the instrument panel can be separated from one another. As a result, a large field of view in the vertical direction, from the pilot outward, is established. As a result, the pilot can freely gaze from top to bottom, through the space between the two parts of the instrument panel.

It is advantageous when the recess tapers. As a result, a compromise can be found between a size of the instrument panel and the size of the recess. The recess can taper, for example, in the direction of the diametrically opposed side.

The recess can also taper from the front side in the direction of the back side. The recess can also taper, however, from the back side in the direction of the front side.

Additionally or alternatively, the recess can also taper from the top side in the direction of the bottom side.

Alternatively, the recess can also taper from the bottom side in the direction of the top side.

The recess can also conically taper.

It is advantageous when the recess has a width of at most 15 cm. Additionally or alternatively, the recess can have a depth of at most 25 cm. As a result, the recess has a sufficient size, so that the pilot sees enough.

In order to design the instrument panel to be more stable, the instrument panel can comprise, in the region of the upper opening, a reinforcing strut extending between the left part and the right part of the instrument panel. Additionally or alternatively, a reinforcing strut can also extend from the left part to the right part in the region of the lower opening.

It is advantageous when the reinforcing strut comprises at least one display unit and/or one control unit. Since the reinforcing strut borders the recess and the pilot mostly observes the surroundings through the recess, the at least one display unit is also in the field of view of the pilot. Important displays, such as flight altitude or airspeed, can be displayed by means of the display unit on the reinforcing strut, which the pilot has directly in his/her view. Additionally or alternatively, the display unit and/or the control unit can also be arranged on the connecting part, so that the pilot also has a view of the display unit.

Moreover, it is advantageous when the instrument panel comprises, at least in some areas, an anti-glare device. The anti-glare device can be arranged around the display unit and/or around the control unit, so that sunlight can be blocked from shining onto the display unit and/or the control unit. As a result, despite the incoming sunlight, the display unit and/or the control unit can be recognized by the pilot. The anti-glare device can also be arranged around the instrument panel, in the region of the recess. The anti-glare device can be designed, for example, as a shade, which is arranged on the instrument panel and extends away therefrom. In the case of the intended use of the instrument panel in the autogyro, the anti-glare device extends in the direction of the pilot and/or the pilot seat. The anti-glare device is arranged in such a way that the shadow of the anti-glare device falls onto the display unit and/or the control unit and, as a result, darkens these.

In order to not limit a size of the instrument panel by too great an extent, the instrument panel can comprise a single recess.

It is also advantageous when the instrument panel comprises at least one extension unit. The extension unit can be arranged, for example, on the bottom side of the instrument panel. The extension unit can be arranged, for example, in a foldable manner on the instrument panel, so that it can be folded away when not in use. The extension unit can also be detachably connected to the instrument panel, so that it can be connected to and removed from the instrument panel. For this purpose, the instrument panel can comprise an interface at which the extension unit can be connected. The extension unit can comprise additional display units and/or control units, in order to be able to display additional functions and/or parameters of the autogyro. For example, the extension unit can be a GPS device. The GPS device can be connected to the instrument panel, in order to display the position of the autogyro on the instrument panel.

It is also advantageous when a depth of a recess of the instrument panel is so great that an autogyro pilot of the 50th percentile has, in a side view of the autogyro, a vertical viewing angle greater than or equal to 20°, starting from his/her viewing point, with respect to a horizontal extending through the viewing point. "50th percentile" means that 50% of the autogyro pilots have a larger body size and 50% of the autogyro pilots have a smaller body size.

Due to the vertical viewing angle of greater than or equal to 20°, the pilot can gaze, starting from his/her eyes, 20° or further below the horizontal through the recess. The pilot can therefore see occurrences ahead of the autogyro, which take place correspondingly close in front of the autogyro.

The vertical viewing angle can also be greater than or equal to 25°, however. As a result, the pilot can see occurrences ahead of the autogyro, which take place even closer to the autogyro.

In order to enable the pilot to have an even better view ahead of the autogyro, the vertical viewing angle can also be 30°.

It is advantageous when at least one further seat is arranged next to the pilot seat, which is arranged centrally in front of the instrument panel. The seat can be arranged to the left or right next to the pilot seat. Additionally, a seat can also be arranged to the left and a seat can be arranged to the right next to the pilot seat. The pilot seat therefore has one further seat on both sides. "Next to the pilot seat" means, of course, that the at least one seat is arranged next to the pilot seat in the transverse direction of the autogyro.

Additionally or alternatively, it is advantageous when at least one additional seat is arranged behind the pilot seat as viewed from the instrument panel. For example, at least two or more, for example, three, four, or five seats can be arranged next to one another behind the pilot seat, as viewed from the instrument panel. A bench for multiple persons can also be arranged behind the pilot seat. Additionally or alternatively, at least three seats can also be arranged in a row one behind one another, i.e., in the axial direction of the autogyro, wherein the foremost or first seat is the pilot seat.

The at least one further seat can be utilized, for example, for transporting a guest. This at least one further seat can be arranged, in particular when it is arranged behind the pilot seat, higher in the autogyro as compared to the pilot seat, so that the view for the guest is improved. If the at least one further seat is arranged behind the pilot seat, it is located behind the pilot seat as viewed from the instrument panel. The pilot seat is therefore arranged between the instrument panel and the further or additional seat. The additional seat can also be arranged centrally, in the transverse direction, in front of the instrument panel, wherein the pilot seat is arranged between the instrument panel and the additional seat. The additional seat can also be arranged centrally, in the transverse direction, in the autogyro. The instrument panel, the pilot seat, and the additional seat can be arranged one behind the other in the longitudinal direction of the autogyro. The additional seat is also located in the cockpit of the autogyro, of course.

The at least one further seat can also be a pilot seat when the autogyro is, for example, a training autogyro, so that a flight instructor and a student pilot must fly the autogyro. A copilot, for example, can also sit in the at least one further seat or pilot seat, however.

A storage area for transporting goods can also be arranged, additionally or alternatively, behind and/or next to the pilot seat.

BRIEF DESCRIPTION OF THE DRAWINGS

Further advantages of the invention are described in the following exemplary embodiments. Wherein.

DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
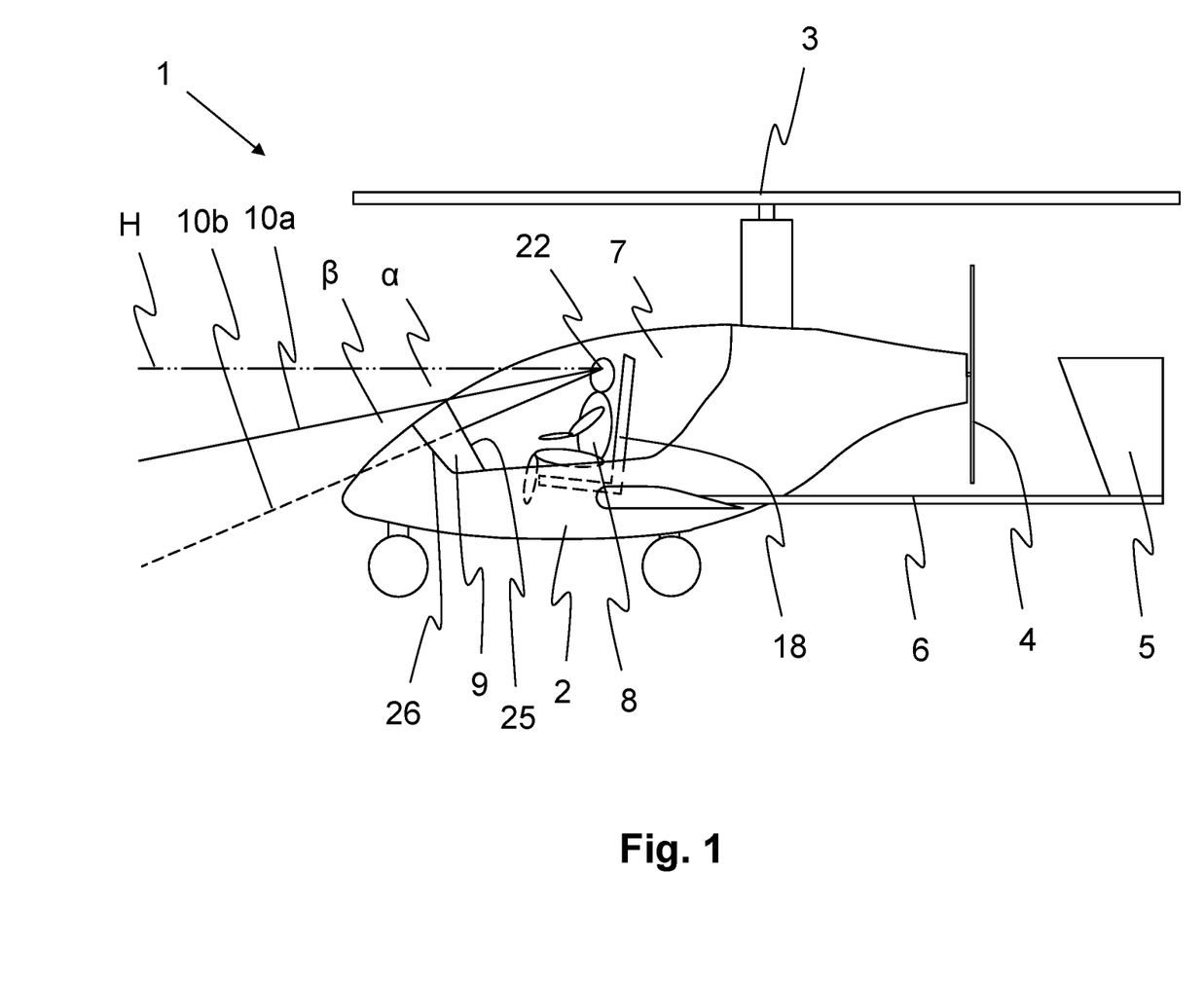
FIG. 1 shows a schematic side view of an autogyro.

FIG. 1 shows a schematic side view of an autogyro 1. The autogyro 1 comprises a fuselage 2, on the upper side of which a rotor 3 is arranged. The rotor 3 is not driven by a motor, but rather can be set into autorotation by a relative wind of the autogyro 1. The autogyro 1 is given lift by way of the rotor 3 set into autorotation.

In order to set the autogyro 1 into forward motion, the autogyro 1 comprises, in the rear region of the fuselage 2, a propeller 4, which can be driven by a motor (not shown here). A tail unit 5, which is connected to the fuselage 2 by means of a strut 6, is arranged in a region behind the propeller 4. The autogyro 1 can be controlled with the aid of the tail unit 5.

A cockpit 7, in which an autogyro pilot 8 can sit, is arranged in a front region of the fuselage 2. The pilot 8 can sit in a pilot seat 18.

An instrument panel 9 is arranged in the front region of the cockpit 7, via which the pilot 8 is informed about parameters of the autogyro 1 and parameters of the flight. Additionally or alternatively, the pilot 8 can control the autogyro 1 with the aid thereof. The instrument panel 9 is arranged in the viewing area of the pilot 8, so that he/she has the displays in view.

The instrument panel 9 comprises a front side 25 facing the autogyro pilot 8. The instrument panel 9 has a back side 26 on the side diametrically opposed to the front side 25.

The instrument panel 9 can also block the view of the pilot 8, however. A viewing direction 10a of the pilot 8 beyond the instrument panel 9 is not blocked. A viewing direction 10b, however, is blocked by the instrument panel 9. The viewing direction 10a has a flatter viewing angle α than the viewing direction 10b, so that, in contrast to the viewing direction 10b, it is only possible to gaze relatively far ahead of the autogyro 1. Occurrences taking place closer to the autogyro 1, which could be observed from the viewing direction 10b, are hidden by the instrument panel 9.

Starting from the pilot 8, a horizontal H can be defined, which is oriented in parallel to the bottom of the autogyro 1. The horizontal H can start from a viewing point 22 of the pilot 8. The viewing angle α can be arranged between the horizontal H and the viewing direction 10a. The viewing angle α corresponds to the angle at which the pilot 8 still has an unobstructed view ahead of the autogyro 1 and below the horizontal H. The viewing direction 10a extends, at the viewing angle α, just above the instrument panel 9. If the pilot 8 gazes downward further than the viewing angle α, his/her view is blocked by the instrument panel 9. Moreover, the viewing angle β can be arranged between the horizontal H and the viewing direction 10b. In the present exemplary embodiment, at the viewing angle β, the view of the pilot 8 is blocked by the instrument panel 9.

A pilot seat 18 is arranged in front of the instrument panel 9. The pilot seat 18 is arranged centrally, in a transverse direction of the autogyro 1, in front of the instrument panel 9.

The autogyro 1 can also comprise at least one further seat (not shown here), which is arranged in the cockpit 7. For example, this at least one additional seat can be arranged behind the pilot seat 18, as viewed from the instrument panel 9. The additional seat can also be arranged centrally, in the transverse direction, in front of the instrument panel 9, but behind the pilot seat 18. The pilot seat 18 is arranged between the instrument panel 9 and the additional seat. The instrument panel 9, the pilot seat 18, and the aforementioned additional seat can be arranged one behind the other in the longitudinal direction of the autogyro 1.

Additionally or alternatively, at least one seat can also be arranged next to the pilot seat 18.

A person who sits on this additional seat cannot reach the instrument panel 9, however, since the pilot seat 18, including the pilot 8, is located there between. The additional seat can be utilized, however, for transporting a guest. Moreover, the additional seat can be arranged higher than the pilot seat 18, so that, as a result, a better view is established.

For example, at least one display and/or control unit can be arranged on the back side of the pilot seat 18 facing away from the pilot 8. With the aid of the display unit, the guest on the additional seat can follow, for example, the route, the speed, altitude, etc. With the aid of the control unit, the guest can, for example, enter or change the route.

The display and/or control unit can be arranged, for example, on a back of the pilot seat 18.

Figure 2:
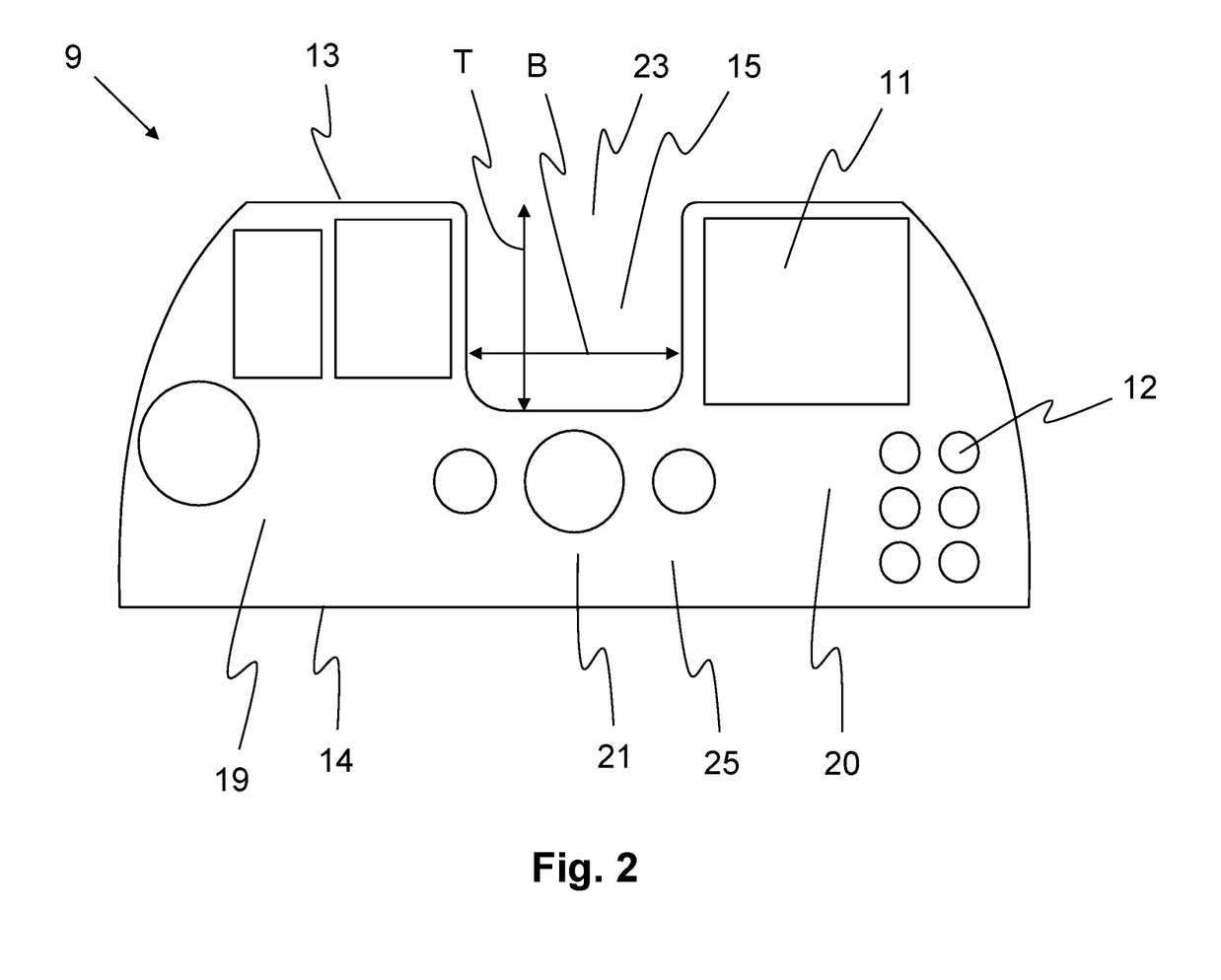
FIG. 2 shows a schematic top view of an instrument panel comprising a recess.

FIG. 2 shows a schematic top view of the instrument panel 9. The instrument panel 9 includes at least one display unit 11, wherein, for the sake of simplicity, only one display unit 11 is provided with a reference number. With the aid of the display unit 11, flight parameters and other information can be displayed to the pilot 8. The display unit 11 can include, for example, a digital display, on which images can be displayed. The display unit 11 can also include an analog display, however.

Additionally or alternatively, the instrument panel 9 can also include at least one control unit 12, wherein, for the sake of simplicity, only one control unit 12 is provided with a reference number. With the aid thereof, the pilot 8 can control the autogyro 1 and/or enter control commands. By means of a control unit 12, the pilot 8 can set, for example, a frequency of a radio. At least the control unit 12 should be arranged on the instrument panel 9 in such a way that it can be comfortably reached by the pilot 8 during the autogyro flight. Additionally or alternatively, the instrument panel 9 can also be arranged in the cockpit 7 in such a way that the pilot 8 reaches all control units 12 and/or display units 11. Due to the orientation of the at least one display unit 11, the instrument panel 9 has a top side 13 and a bottom side 14.

The display unit 11 and/or the control unit 12 are arranged on the front side 25 of the instrument panel 9.

In order to expand a field of view for the autogyro pilot 8, the instrument panel 9 comprises at least one viewing window, which is formed by a recess 15 in the instrument panel 9. In the present exemplary embodiment, the recess 15 extends, starting from the top side 13, in the direction of the bottom side 14. Moreover, the recess 15 can be arranged in a central region of the instrument panel 9. The pilot 8 from FIG. 1 can therefore gaze through the recess 15, so that he/she can observe the surroundings a short distance ahead of the autogyro 1. In particular, due to the recess 15, the viewing direction 10b along the viewing angle β can no longer be blocked. The pilot 8 can therefore gaze through the recess 15 up to the viewing angle β below the horizontal H.

In the present exemplary embodiment, the recess 15 comprises an upper opening 23 on the top side 13 of the instrument panel 9.

The recess 15 has a width B, which can be at most 15 cm. Moreover, the recess 15 has a depth T, which can be at most 25 cm. The depth T can be so great, however, that an autogyro pilot 8 of the 50th percentile has, in a side view of the autogyro 1, the vertical viewing angle β greater than or equal to 20°, starting from his/her viewing point 22 (cf. FIG. 1), with respect to the horizontal H extending through the viewing point 22. Due to the recess 15, the viewing direction 10b along the viewing angle β is no longer blocked. The pilot 8 can therefore also gaze forward, ahead of the autogyro 1, at the viewing angle β, which can have an angle of 20°. The pilot 8 can gaze between the viewing angle α and the viewing angle β through the recess 15. The viewing angle β can be greater than or equal to 25°, however, so that the pilot 8 can gaze even closer ahead of the autogyro 1. In order to be able to gaze even closer ahead of the autogyro 1, the viewing angle β can also be greater than or equal to 30°, however.

Due to the recess 15, for example, the view direction 10b from FIG. 1 is no longer interrupted, so that occurrences taking place ahead of the autogyro 1 can be detected. The air safety of the autogyro 1 is increased as a result.

Moreover, the instrument panel 9 can comprise a left part 19 and a right part 20. A connecting part 21 can be arranged between the left part 19 and the right part 20. The recess 15 can be arranged between the left part 19 and the right part 20. According to the present exemplary embodiment, the left part 19, the connecting part 21, and the right part 20 are arranged in such a way that the instrument panel 9 has a U-shape.

Figure 3:
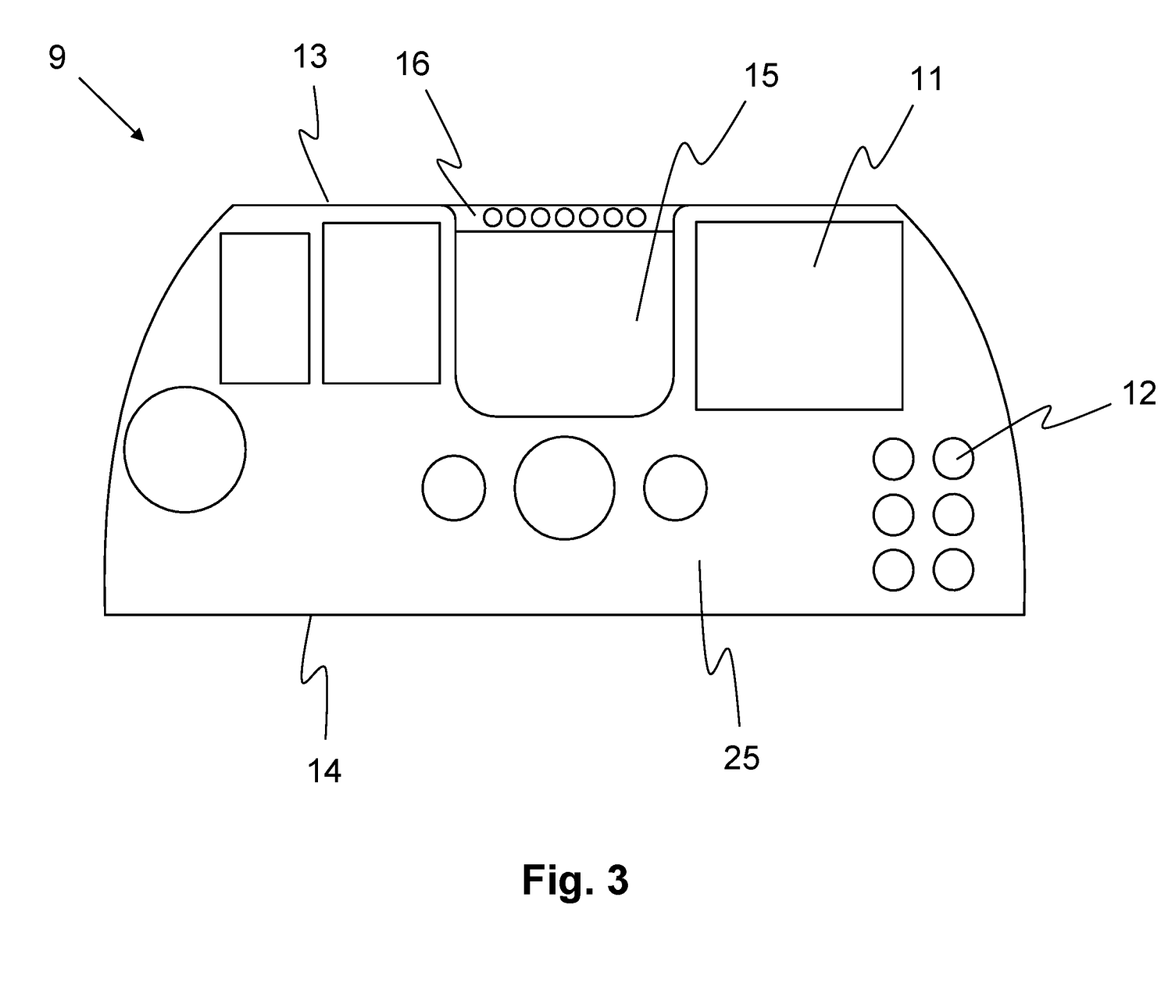
FIG. 3 shows a schematic top view of an instrument panel comprising a web, which borders the recess.

FIG. 3 shows a further exemplary embodiment of the instrument panel 9. In this case, the recess 15 is at least partially bordered by a reinforcing strut 16. The reinforcing strut 16 delimits the recess 15 at the top side 13 of the instrument panel 9. With the aid of the reinforcing strut 16, the instrument panel 9 can be designed to be more stable. As shown in the present exemplary embodiment, the reinforcing strut 16 can also comprise display units 11 and/or control units 12. Since the pilot 8 can gaze through the recess 15, the display units 11 and/or the control units 12 are directly in the field of view of the pilot 8. Important information regarding the autogyro 1 and/or the flight can be reliably communicated to the pilot 8 in this way.

Figure 4:
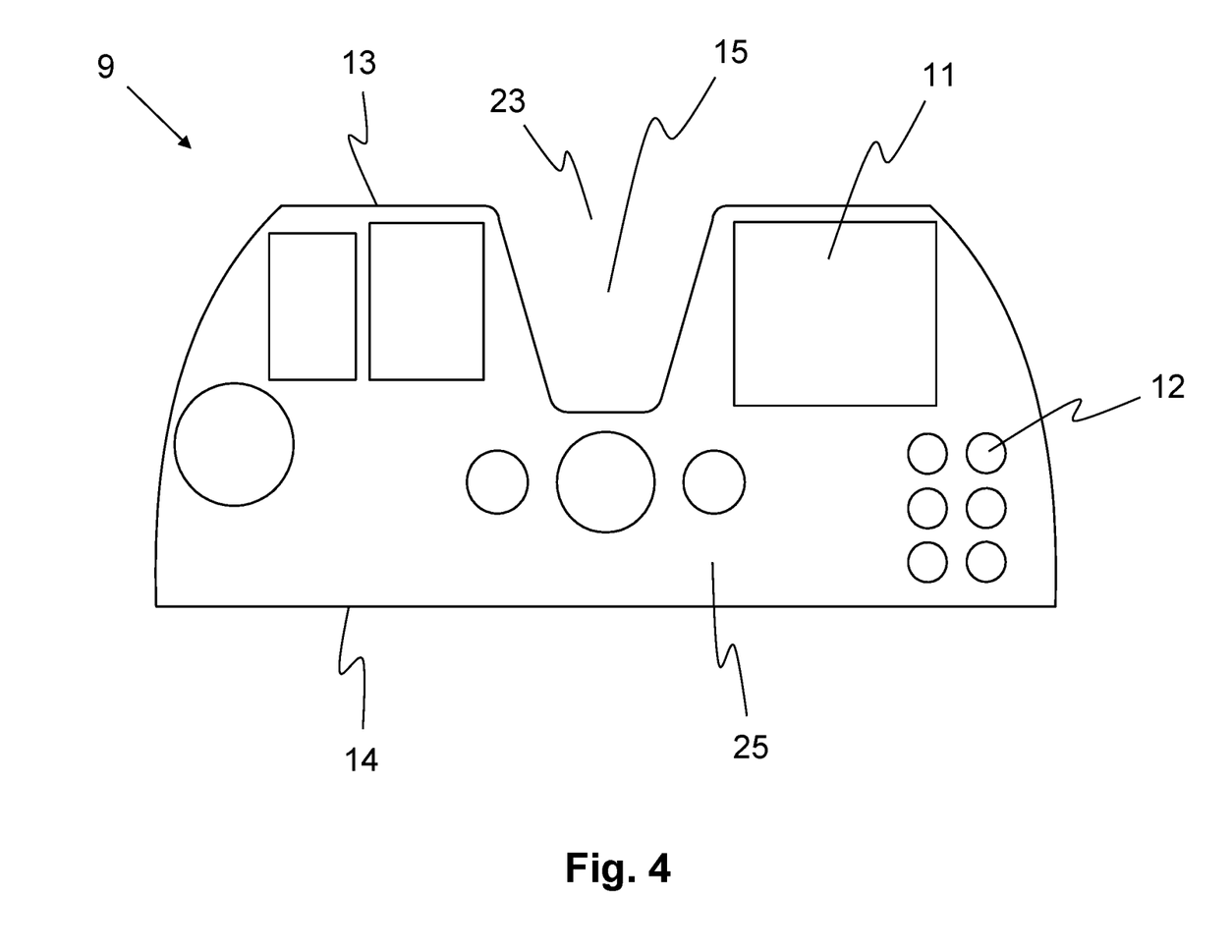
FIG. 4 shows a schematic top view of an instrument panel comprising a tapering recess.

FIG. 4 shows a further exemplary embodiment of the instrument panel 9. In this case, the recess 15 tapers from the top side 13 in the direction of the bottom side 14. The recess 15 can conically taper. In the present exemplary embodiment, the recess 15 is designed in a V-shape.

Figure 5:
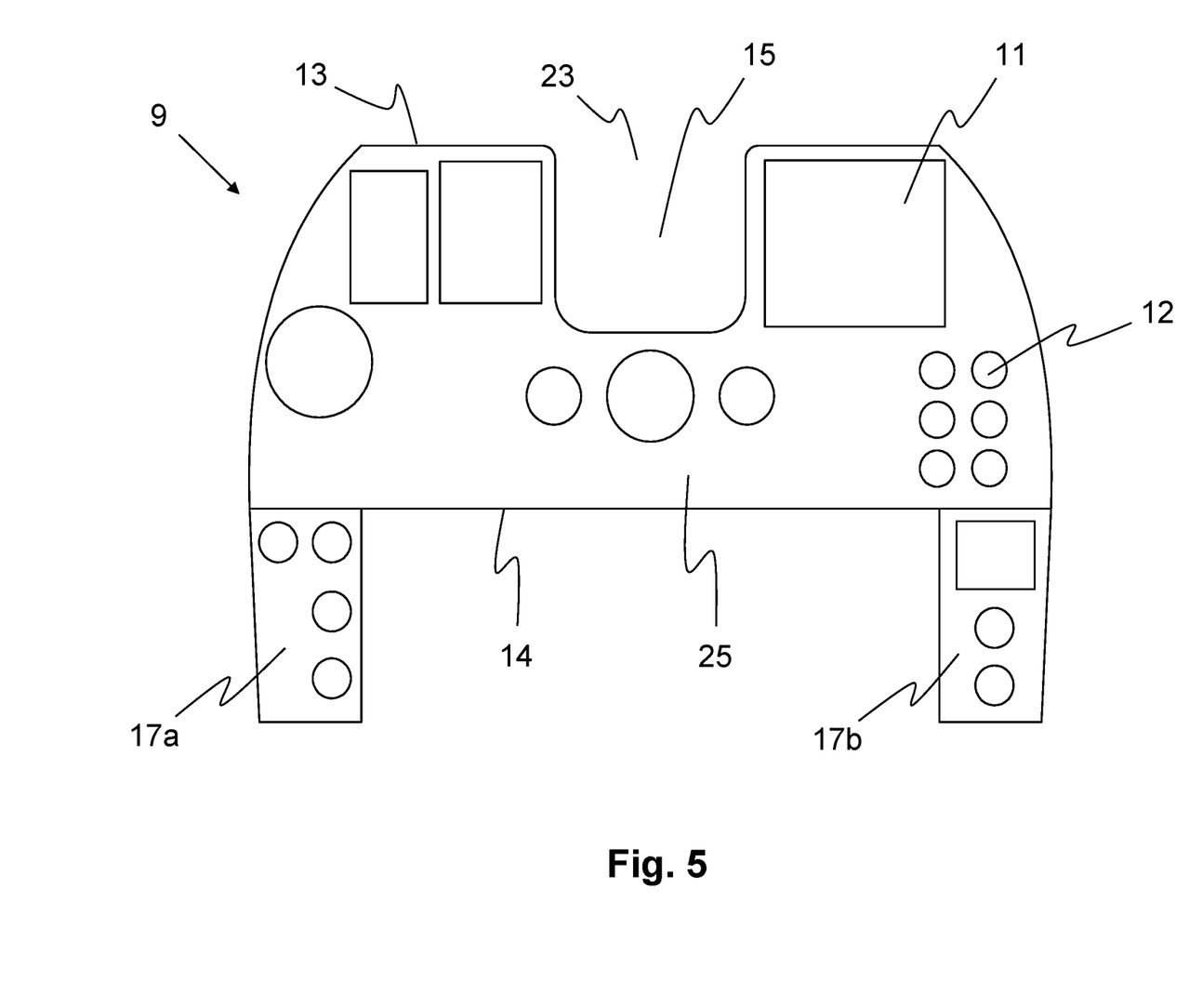
FIG. 5 shows a schematic top view of an instrument panel comprising at least one extension unit.

FIG. 5 shows a further exemplary embodiment of the instrument panel 9. The instrument panel 9 comprises at least one extension element 17a, 17b, which can comprise display units 11 and/or control units 12. In the present exemplary embodiment, the instrument panel 9 comprises two extension elements 17a, 17b. The at least one extension element 17a, 17b is arranged, according to FIG. 5, on the bottom side 14 of the instrument panel 9. The extension element 17a, 17b can be arranged, for example, in a foldable manner on the instrument panel 9, so that it can be folded in order to save space. The extension element 17a, 17b can also be detachably connected to the instrument panel 9. The extension element 17a, 17b can therefore be connected to the instrument panel 9 and can be removed when not in use. For this purpose, the instrument panel 9 comprises an interface (not shown here), at which the extension element 17a, 17b can be connected. The extension element 17a, 17b can be, for example, a GPS device, which can be connected to the instrument panel 9.

Figure 6:
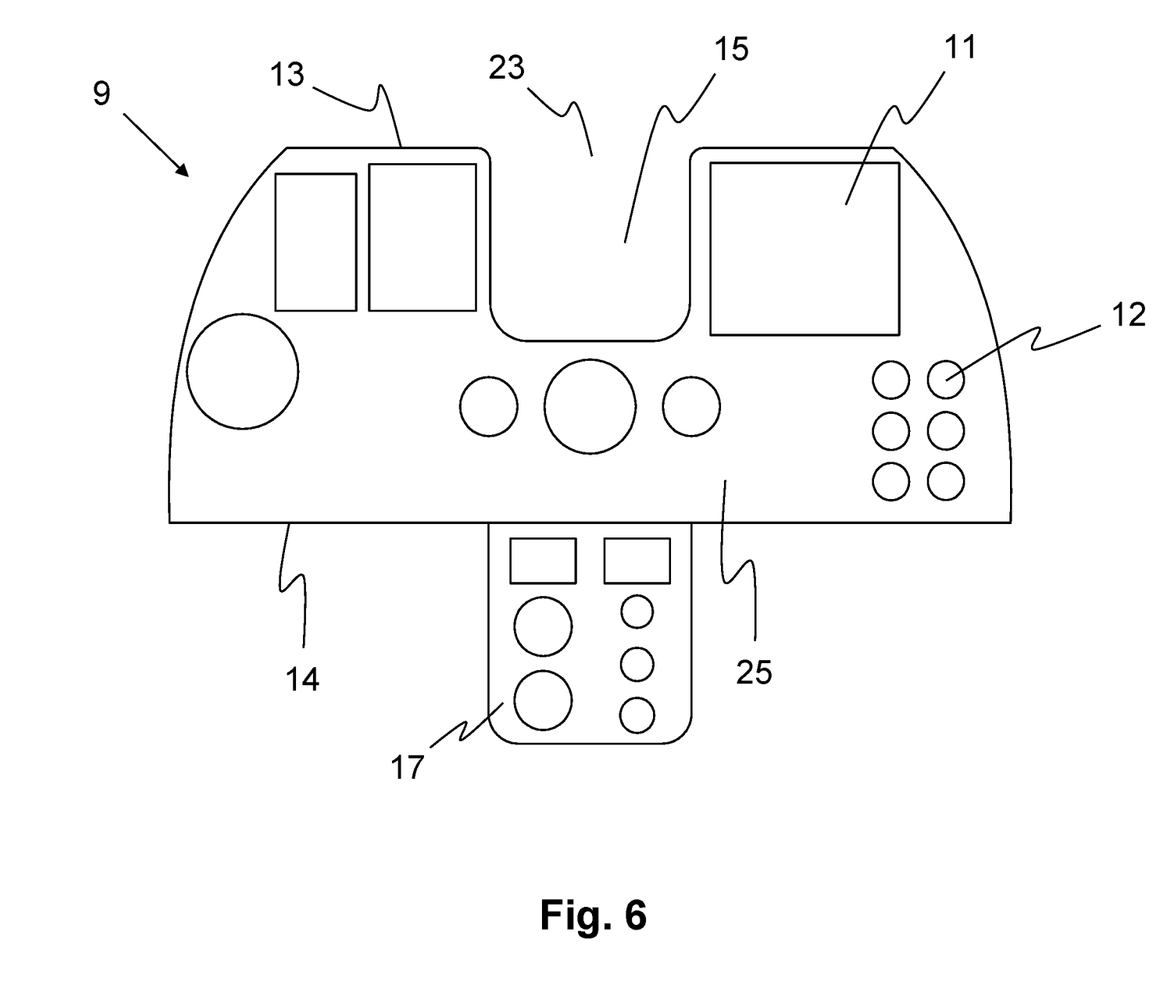
FIG. 6 shows a schematic top view of an instrument panel comprising a centrally arranged extension unit.

FIG. 6 shows a further exemplary embodiment of the instrument panel 9 comprising a centrally arranged extension unit 17. In this exemplary embodiment, the extension unit 17 is centrally arranged on the bottom side 14 of the instrument panel 9. As a result, the autogyro pilot 8 can gaze forward, through the recess 15, ahead of the autogyro 1. Additionally, the autogyro pilot 8 can gaze forward, laterally past the extension unit 17, obliquely toward the left and right. Advantageously, the recess 15 and the extension unit according to the present exemplary embodiment can lie on a vertical axis. When the instrument panel 9 is installed into the autogyro 1 as intended, the recess 15 is arranged over the extension unit 17. As a result, an unobstructed view is established for the autogyro pilot 8 either through the recess 15 or laterally past the extension unit 17.

Figure 7:
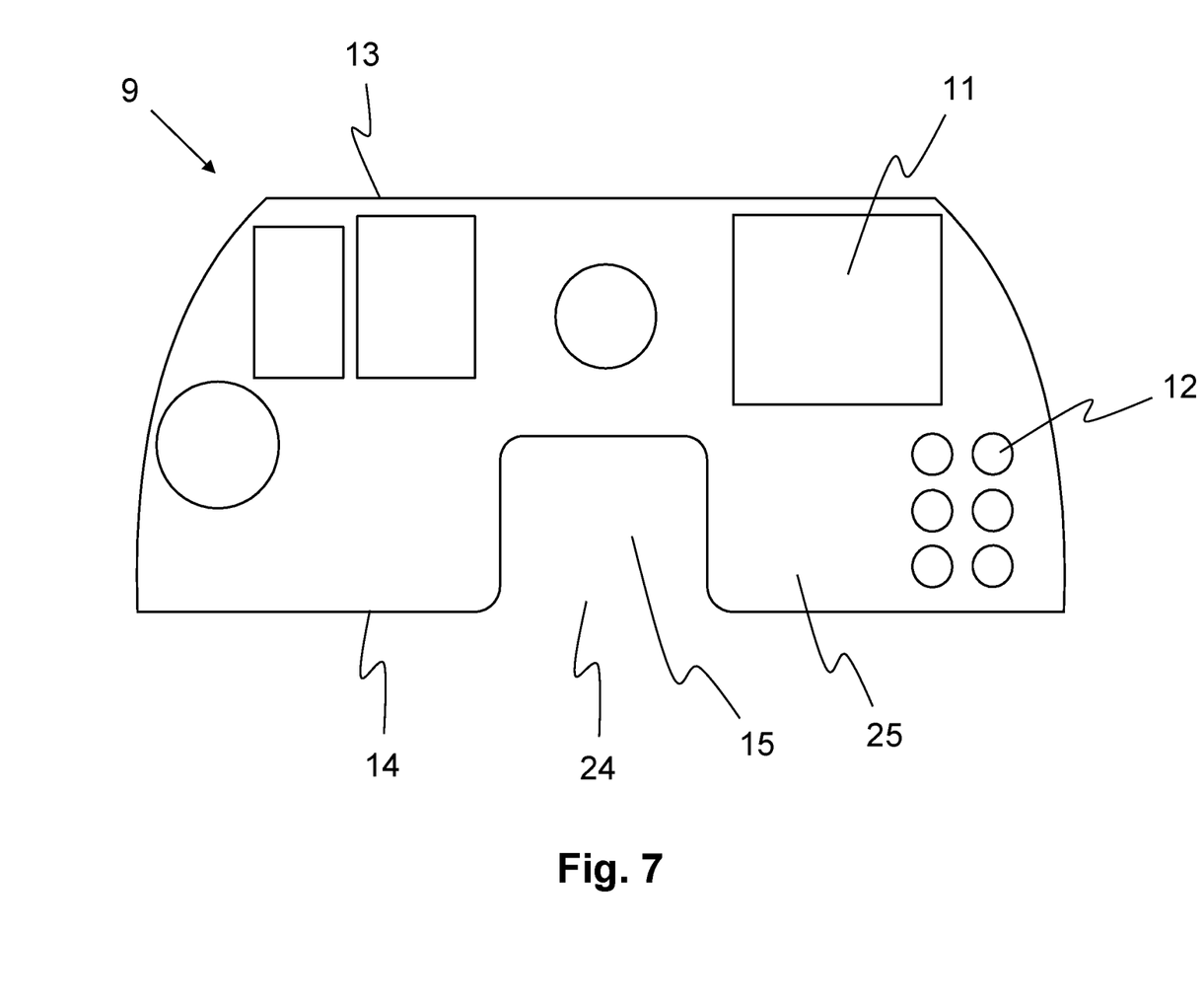
FIG. 7 shows a schematic top view of an instrument panel comprising recess on a bottom side.

FIG. 7 shows a schematic view of an instrument panel 9 comprising a recess 15, wherein the recess 15 is arranged on the bottom side 14. The recess 15 extends from the bottom side 14 in the direction of the top side 13. Due to such a recess 15, the pilot 8 can gaze steeply downward ahead of the autogyro 1. As a result, for example, a front wheel of the autogyro 1 and whether, for example, it is blocked by an object can be observed.

Figure 8:
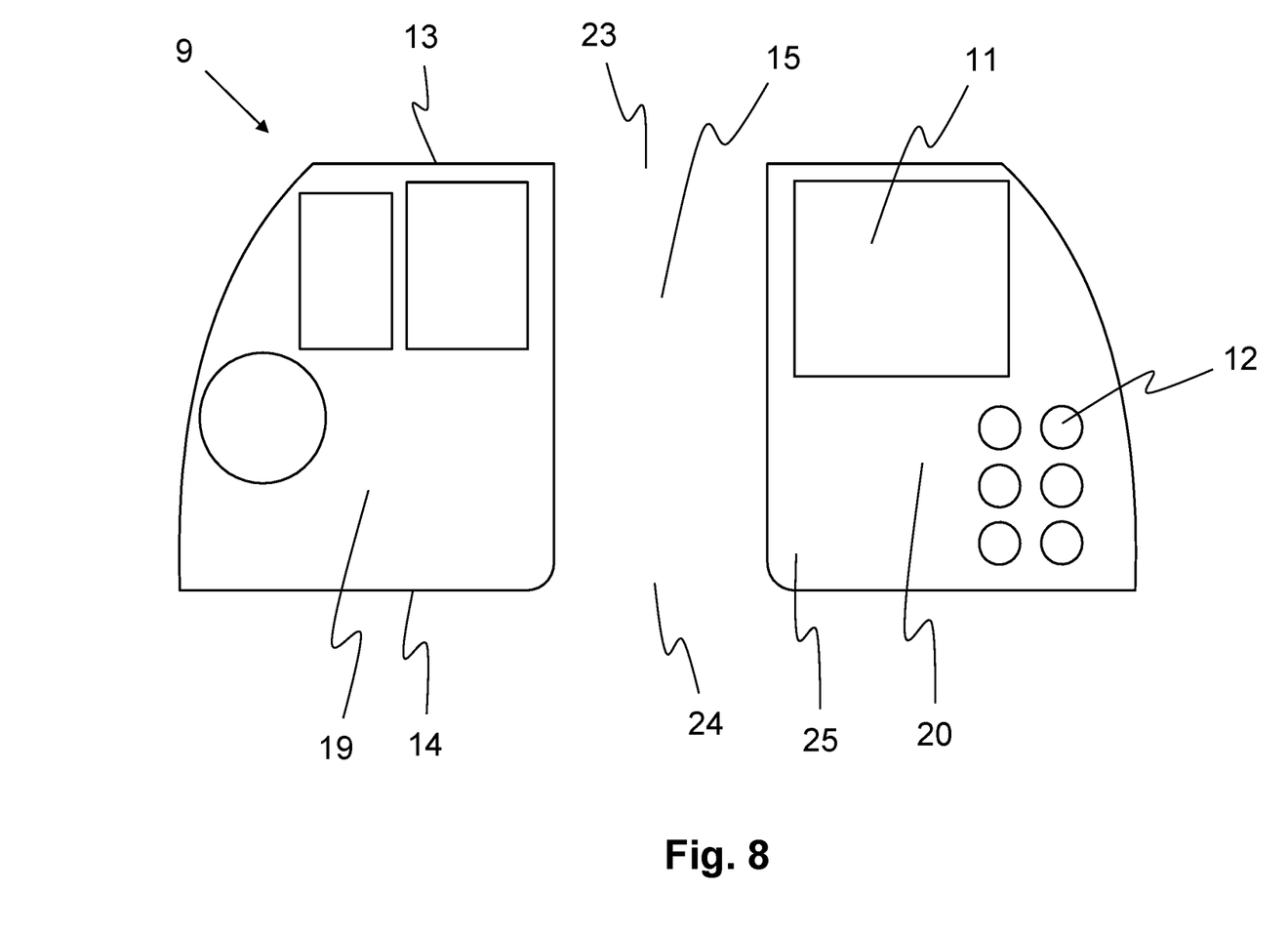
FIG. 8 shows a schematic top view of an instrument panel, which is split.

FIG. 8 shows a schematic view of an instrument panel 9, which is split. The left part 19 is separated from the right part 20 by the recess 15. The recess 15 extends completely through the instrument panel 9 from the upper opening 23 to the lower opening 24. Additionally, the left part 19 and the right part 20 of the instrument panel 9 can be connected to one another by means of at least one reinforcing strut 16 (not shown here).

Figure 9:
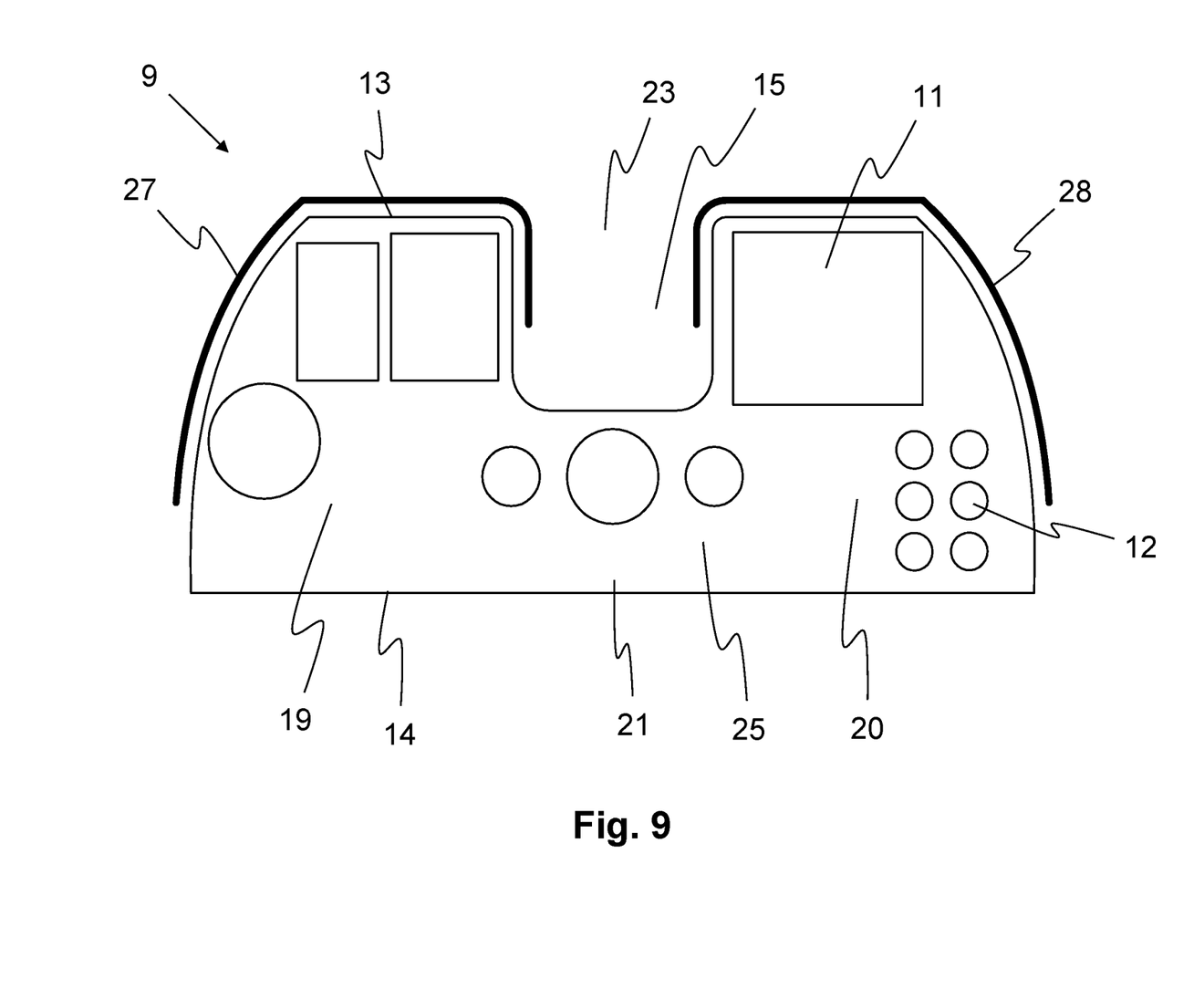
FIG. 9 shows a schematic top view of an instrument panel comprising at least one anti-glare device.

FIG. 9 shows a schematic view of an instrument panel 9 comprising at least one anti-glare device 27, 28. According to the present exemplary embodiment, the instrument panel 9 comprises two anti-glare devices 27, 28. The first anti-glare device 27 is associated with the left part 19 and the second anti-glare device 28 is associated with the right part 20. The anti-glare devices 27, 28 are schematically represented here and can be designed, for example, as shades. The at least one anti-glare device 27, 28 extends, at least in some areas, around the instrument panel 9. At least one anti-glare device 27, 28 extends away from the instrument panel 9. In particular, when the instrument panel 9 is arranged in the autogyro 1 as intended (as shown, for example, in FIG. 1), the at least one anti-glare device 27, 28 extends in the direction of the pilot seat 18. According to the present exemplary embodiment, the at least one anti-glare device 27, 28 also extends into the recess 15. With the aid of the anti-glare device 27, 28, sunlight can be blocked from shining onto the display unit 11 and/or the control unit 12, so that these can be better recognized. In particular, the at least one anti-glare device 27, 28 is arranged in such a way that a shadow falls onto the display unit 11 and/or the control unit 12.

The present invention is not limited to the represented and described exemplary embodiments. Modifications within the scope of the claims are also possible, as is any combination of the features, even if they are represented and described in different exemplary embodiments.

LIST OF REFERENCE NUMBERS 1 autogyro
2 fuselage
3 rotor
4 propeller
5 tail unit
6 strut
7 cockpit
8 autogyro pilot
9 instrument panel
10 viewing direction
11 display unit
12 control unit
13 top side
14 bottom side
15 recess
16 reinforcing strut
17 extension element
18 pilot seat
19 left part
20 right part
21 connecting part
22 viewing point
23 upper opening
24 lower opening
25 front side
26 back side
27 first anti-glare device
27 second anti-glare device
28 H horizontal
α viewing angle
β viewing angle
T depth of the recess
B width of the recess

The invention claimed is:

1. An autogyro, comprising:
an autorotation rotor;
an instrument panel comprising one or both of a display unit and a control unit;
the instrument panel comprising a viewing window formed by a recess in the instrument panel located to expand a field of view for an autogyro pilot;
a pilot seat arranged in front of the instrument panel, the pilot seat positioned centrally in a transverse direction of the autogyro in front of the instrument panel; and
wherein the recess is arranged in a middle central region in the transverse direction of the instrument panel.

2. The autogyro as in claim 1, wherein the recess extends completely through the instrument panel from a front side of the instrument panel comprising the display unit or the control unit to a diametrically opposed back side of the instrument panel.

3. The autogyro as in claim 1, wherein the recess extends from a top side of the instrument panel in the direction of a bottom side of the instrument panel.

4. The autogyro as in claim 3, wherein the recess extends only partially in the direction of the bottom side such that a connecting part of the instrument panel extends in the transverse direction and connects a left part and a right part of the instrument panel.

5. The autogyro as in claim 4, wherein the instrument panel has a U-shape as viewed from a front of the instrument panel.

6. The autogyro as in claim 3, wherein the recess extends completely through the bottom side and comprises an upper opening and a lower opening between a left part and a separate right part of the instrument panel.

7. The autogyro as in claim 6, the instrument panel comprises a reinforcing strut extending between the left part and the right part of the instrument panel.

8. The autogyro as in claim 7, wherein the reinforcing strut comprises one or both of the display unit or the control unit for the autogyro.

9. The autogyro as in claim 1, wherein the recess tapers in one of the following directions: between a front side towards a back side of the instrument panel; between a top side and the front side of the instrument; or between the top side and a bottom side of the instrument panel.

10. The autogyro as in claim 1, wherein the recess has a width of at most 15 cm and a depth of at most 25 cm.

11. The autogyro as in claim 1, wherein the instrument panel comprises at least one anti-glare device.

12. The autogyro as in claim 1, wherein the recess has such a depth that an autogyro pilot of a 50th percentile body size has a vertical viewing angle ($\alpha$, $\beta$) greater than or equal to 20° relative to a horizontal viewing point of the autogyro pilot.

13. The autogyro as in claim 1, further comprising an additional seat adjacent to or behind the pilot seat.

* * * * *